United States Patent
Boncek

(10) Patent No.: US 6,542,689 B1
(45) Date of Patent: Apr. 1, 2003

(54) ATTENUATOR FOR BUFFERED OPTICAL FIBERS

(75) Inventor: Raymond K. Boncek, Lawrenceville, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/439,671

(22) Filed: Nov. 15, 1999

(51) Int. Cl.⁷ ................................................ G02B 6/00
(52) U.S. Cl. ........................................ 385/140; 385/37
(58) Field of Search ......................... 385/37, 140, 32, 385/31

(56) References Cited

U.S. PATENT DOCUMENTS

| | | | |
|---|---|---|---|
| 3,931,518 A | | 1/1976 | Miller |
| 4,253,727 A | * | 3/1981 | Jeunhomme et al. .......... 385/28 |
| 4,586,783 A | * | 5/1986 | Campbell et al. ............ 359/180 |
| 4,749,248 A | | 6/1988 | Aberson |
| 4,781,428 A | * | 11/1988 | Epworth et al. ............. 359/900 |
| 6,282,341 B1 | * | 8/2001 | Digonnet et al. ............ 359/130 |
| 6,408,117 B1 | * | 6/2002 | Mollenauer ............. 359/337.21 |

OTHER PUBLICATIONS

ADC Telecommunications, Adjustable Optical Attenuation Patch Cord, one page (Jan. 1995).

Net Optics, Attenuators for FiberOptic Networks, Internet Advertisement, four pages.

Siecor, Variable Optical Attenuators, Internet Advertisement, three pages.

D. Marcuse, Theory of Dielectric Optical Wave Guides, Academic Press (2d Ed. 1974), pp. 83–84, 134–139, 157–158.

M.B.J. Diemeer, et al, Fiber–Optic Microbend Sensors, Optics Letters (Jun. 1984), pp. 280–282.

L. T. Wood, et al, Optical Attenuation by Periodic Micro–Distortions of a Sensor Fiber, Optics Letters (Dec. 1985) at 632–34.

Timoshenko, et al, Theory of Elastic Stability, McGraw–Hill (2d Ed. 1961) at 24–31.

* cited by examiner

Primary Examiner—Hemang Sanghavi
Assistant Examiner—Scott Knauss
(74) Attorney, Agent, or Firm—Law Office of Leo Zucker

(57) ABSTRACT

Signals propagating in a buffered optical fiber within, for example, an optical jumper cable, are attenuated by clamping a grating along an axial length of buffer material on the fiber. A fundamental resonant coupling or grating period that would induce attenuation of light signals in the fiber in the absence of buffer material, is determined. The grating clamped on the fiber has a periodicity that is N times the determined fundamental period, wherein N is a positive integer.

7 Claims, 5 Drawing Sheets

ATTENUATOR FOR BUFFERED OPTICAL FIBERS

BACKGROUND OF THE INVENTION

1. Field of the Invention

This invention relates to attenuators for use with optical fibers.

2. Discussion of the Known Art

Signals carried by optical fibers require attenuation for various purposes, including but not limited to optical signal equalization of separate voice or data channels that are coupled to an optical multiplexing or de-multiplexing device. Attenuation is also necessary to reduce the level of optical signals at a receiving device, e.g., to keep the signals within a linear operating range of the device. Attenuators can also be used in optical sensing elements and optical actuators. All of the foregoing instances requiring attenuation of optical signals are best implemented with a controllable, variable optical attenuator device.

It is also desirable to incorporate a variable optical attenuator with so-called "jumpers" that are found typically near optical transmitter and receiver devices such as, e.g., cable TV laser transmitters at a network operations center, a SONET multiplexer at a central office or a remote cabinet, or a data network switch or hub in an equipment room for a local area network (LAN). Jumpers are also used to connect a desk top computer or server to a wall outlet in a LAN, and for inter-connecting and cross-connecting indoor building equipment with outside plant cables. While optical fiber jumpers are typically of short length (about 2 to 10 meters), some may be as long as 300 meters. Jumpers take the form of fiber optic cables with optical connectors such as types ST, SC or LC, on each end of the cable. A jumper cable typically has a central glass optical fiber, an ultra-violet (UV) cured coating, a surrounding layer of buffer material, aramid yarn around the buffer layer, and a protective outer cable jacket.

Basically, there are four techniques for attenuating a light signal propagating within an optical fiber with some degree of control; namely, absorption, scattering, macrobending, and microbending.

Absorption and scattering of light are used typically in fixed optical attenuators, but it is difficult to manufacture such attenuators to obtain small attenuation values. Also, return losses greater than −60 dB are common.

Macrobending of optical fibers in loops may also produce attenuation, but requires very small bend radii to achieve large levels of attenuation. And, the presence of small bend radii leads to excessive stress on the fibers, causing mechanical damage when held in the fibers for long periods of time.

Microbending of optical fibers by clamping mechanical gratings having teeth or other periodic undulations about the fiber, has also been used for signal attenuation as discussed below. With such gratings, optical fibers can be forced to attenuate light guided within them when the mechanical grating period corresponds to a resonant coupling period of guided to non-guided light propagation modes in the fiber. See D. Marcuse, Theory of Dielectric Optical Waveguides, Academic Press (2d ed. 1974) at pages 83–84, 134–39, and 157–58, all of which is incorporated by reference. For an optical fiber of 250 microns diameter (including UV coating but without buffer material), the fundamental mechanical grating periods are typically about 350 microns for a single-mode fiber, and about 1,000 microns for a graded-index multi-mode fiber. For fibers that are coated with a thick buffer layer so that the overall diameter of the composite fiber is about 900 microns, mechanical gratings having such periodicity will require a relatively large clamping force to induce attenuation in the fiber, because of the thick buffer layer surrounding the fiber, however.

Variable optical attenuators for single or multi-mode optical fibers are known in the form of devices arranged to be connected in-line with an existing fiber optic cable, through cable connectors mounted on the device, For example, devices are offered by Net Optics which operate by adjustably mis-aligning optical fibers within the device, or by moving a threaded screw to block a collimated beam between two lenses in the device. Variable optical attenuators offered by Siecor as complete cable assemblies with standard connectors at each cable end, have an attenuator device integrated along the length of the cable. Rotation of a screw on the device operates to vary the position of a gradient filter within a light beam in the device.

As mentioned above, it is known that light signals passing through an optical fiber may be attenuated by application of an external clamping mechanism to induce periodic microbends in the fiber, thus allowing some of the light signal energy carried by the fiber to be lost, e.g. by radiation peripherally out of the fiber. See, e.g., L. T. Wood, et al, Optical Attenuation by Periodic Microdistortions of a Sensor Fiber, Optics Letters (December 1985), at 632–34; and M. B. J. Diemeer, et al, Fiber-Optic MicrobendSensors: Sensitivity as a Function of Distortion Wavelength, Optics Letters (June 1984), at 260–62. See also U.S. Pat. No. 4,749,248 (Jun. 7, 1988) and U.S. Pat. No. 3,931,518 (Jan. 6, 1976). Both of these patents disclose clamp-on devices in the form of opposed, corrugated plates that are clamped about a fiber to achieve a periodic axial distortion of the fiber for purposes of mode coupling.

The known clamping techniques are directed to non-buffered optical fibers, however. As mentioned, buffered optical fibers of the kind used in jumper cables typically comprise an optical fiber (core, cladding and UV coating) with a diameter of about 250 microns, and a surrounding protective layer of buffer material (e.g., nylon, PVC or PE) having an overall diameter typically of about 900 microns. Because of the relatively large clamping force needed to induce a certain degree of microbending in a buffered optical fiber, with respect to the force needed if the same grating was used to induce the same amount of microbending in an unbuffered fiber, it was not believed practical to apply a grating on jumper cables with buffered optical fibers for the purpose of obtaining a controlled amount of light signal attenuation.

SUMMARY OF THE INVENTION

According to the invention, a method of attenuating signals propagating in an optical fiber of a first diameter and having a buffer material disposed about the fiber to form a buffered optical fiber having a second diameter greater than said first diameter, includes determining a fundamental grating period that would induce attenuation of signals propagating in the optical fiber in the absence of the buffer material, and clamping a grating along a certain axial length of the buffer material on the fiber. The grating is formed with a period that is N times the fundamental grating period for the optical fiber, wherein N is a positive integer.

For a better understanding of the invention, reference is made to the following description taken in conjunction with the accompanying drawing and the appended claims.

DETAILED DESCRIPTION OF THE INVENTION

Figure 1:
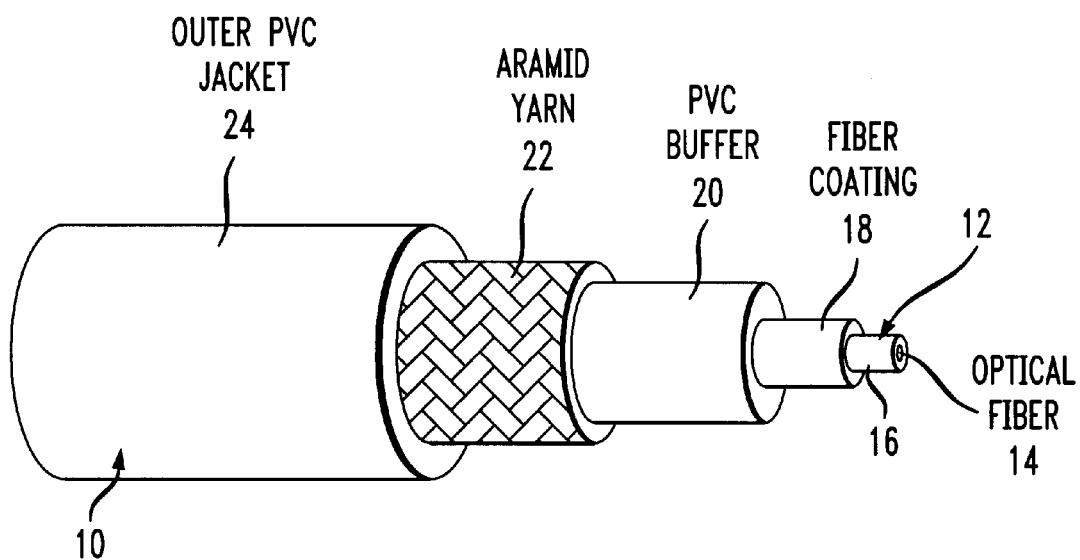
FIG. 1 illustrates a construction of a typical jacketed fiber optic cable having a buffered optical fiber.

FIG. 1 shows an interior construction of a typical jacketed fiber optic cable 10. An optical fiber 12 at the center of the cable has a central core 14 which is surrounded coaxially by cladding 16, as generally known in the art. An ultra-violet (UV) cured coating 18 surrounds and protects the cladding 16 from scratches and other mechanical damage. The optical fiber 12 with the protective UV-cured coating 18 has an overall diameter typically of about 250 microns, or about 0.010 inches.

Jacketed fiber optic cables such as the cable 10 in FIG. 1, may also have a buffer layer 20 made from nylon, polyvinyl chloride (PVC) or polyethylene (PE), drawn coaxially about the coating 18 to protect the fiber 12 further from mechanical damage. The overall diameter of the buffer layer 20 typically measures about 900 microns. The buffer layer 20 is surrounded by a flexible strong textile material 22 such as aramid yarn. An insulating (e.g., PVC) jacket 24 forms an outer protective covering for the cable 10.

As mentioned earlier, situations arise where there is a need to provide a controlled amount of attenuation, for example, of from about −1.5 to about −20 dB, to light signals carried by optical fibers in jumpers and other fiber optic cables. In such cases, it is not convenient or desirable to "open" or cut the cable completely to introduce an in-line attenuator. That is, it is advantageous to preserve as much as possible the integrity of the original cable, particularly the optical fiber 12 at the center of the cable.

Figure 2:
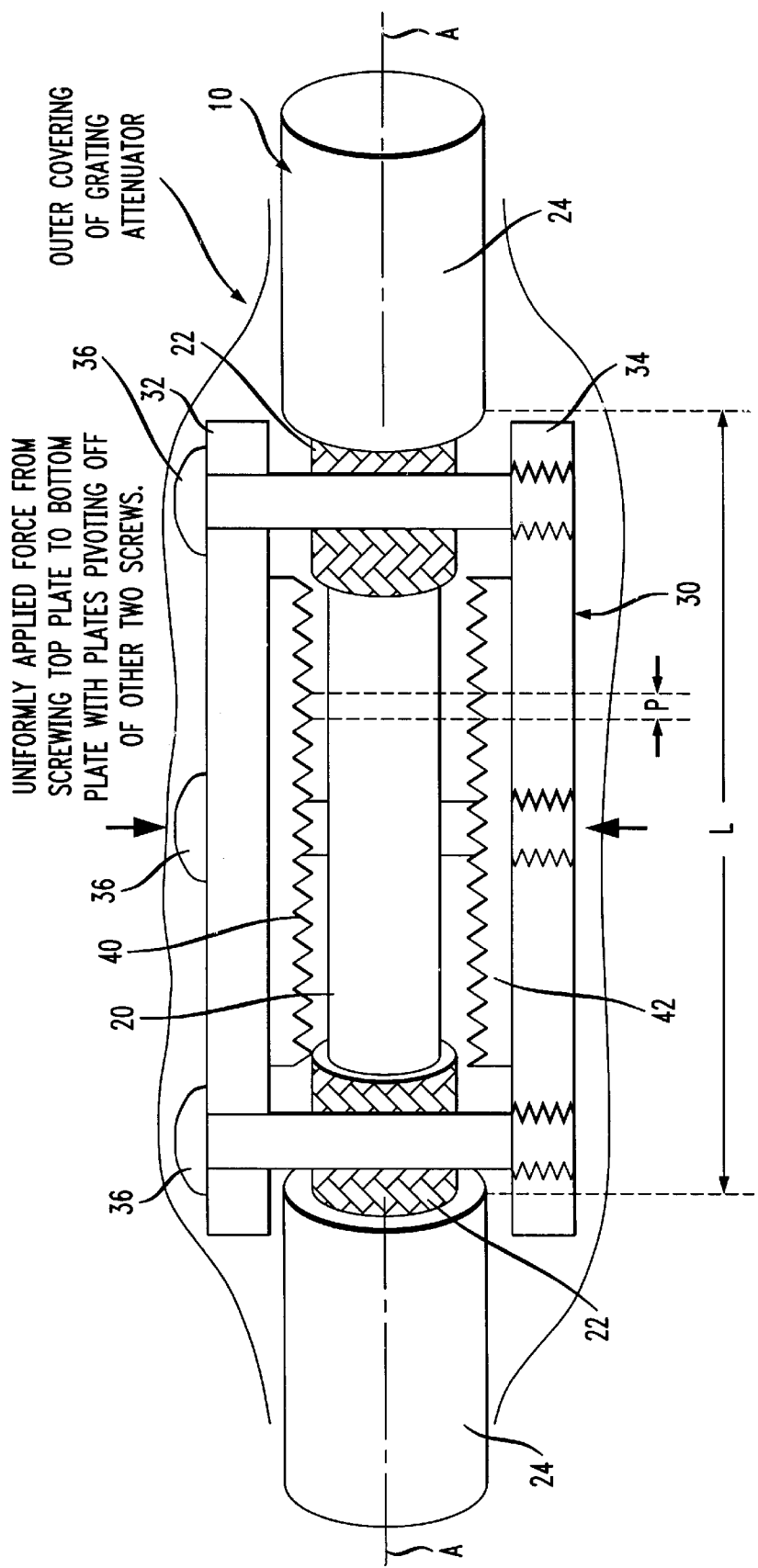
FIG. 2 shows a grating device applied over an axial length of the optical fiber in the cable of FIG. 1.

FIG. 2 is a view of a length of the fiber optic cable 10 in FIG. 1, with a first embodiment of a grating attenuator 30 applied on the cable according to the invention. An axial length L of the cable jacket 24, e.g., about one inch or greater, is cut away to expose the textile material 22. About a one inch length of the material 22 is also removed, thus exposing the outer surface of the buffer layer 20. The grating attenuator 30 is then applied directly along an axial length of the outer surface of the buffer layer 20, as seen in FIG. 2.

In the illustrated embodiment, the grating attenuator 30 comprises a pair of rigid plates 32, 34 each having major surfaces of sufficient area to extend transversely of the cable axis A, and to accommodate a number of clamping screws 36 arranged to extend through the plates 32, 34 at either side of the cable axis A and clear of the cable 10. Two of the screws 36 are placed at opposite axial ends of the plates 32, and one of the screws is located at a position intermediate the end screws.

The plates 32, 34 have complementary gratings 40, 42 that are formed integrally on the confronting major surfaces of the plates, along the direction of the cable axis A. The gratings 40, 42 may also be formed separately and then fixed to the plates 32, 34.

It has been discovered that if teeth or other undulations are formed on the gratings 40, 42 with a period P that is an integer multiple (N>1) or "order" of a determined fundamental grating period for the fiber 12, attenuation is nonetheless induced in light signals carried by the fiber at values that can be adjusted (e.g., by tightening or loosening of the clamping screws 36) from zero to more than −20 dB. Importantly, there is no need for excessive clamping force notwithstanding the presence of the buffer layer 20. Return loss characteristics have also been found to be better than −60 dB.

For example, as discussed below, the fundamental grating period for a single-mode, coated (but not buffered) fiber of 250 microns diameter, is about 350 microns. If N is set equal to four, the periodicity P for the gratings 40, 42 becomes about 1,400 microns. For a graded-index, multi-mode fiber, the fundamental grating period is about 1,000 microns. Setting N equal to four, the periodicity P for the "teeth" of the gratings 40, 42 becomes about 4,000 microns. Examples of the amount of clamping force needed for a desired value of attenuation using gratings of different order periods, are given below with respect to FIGS. 5–7.

Accordingly, the grating attenuator 30 may be used on existing fiber optic jumper cables with minimal intrusion to the cable. The attenuator 30 obviates the need for mechanisms that control alignment between optical fibers or lenses, as are used in the known variable optical attenuators. And the attenuator 30 provides a relatively low cost and easily implemented technique that can be applied to jumper and other cables having single and multi-mode buffered optical fibers.

Figure 3:
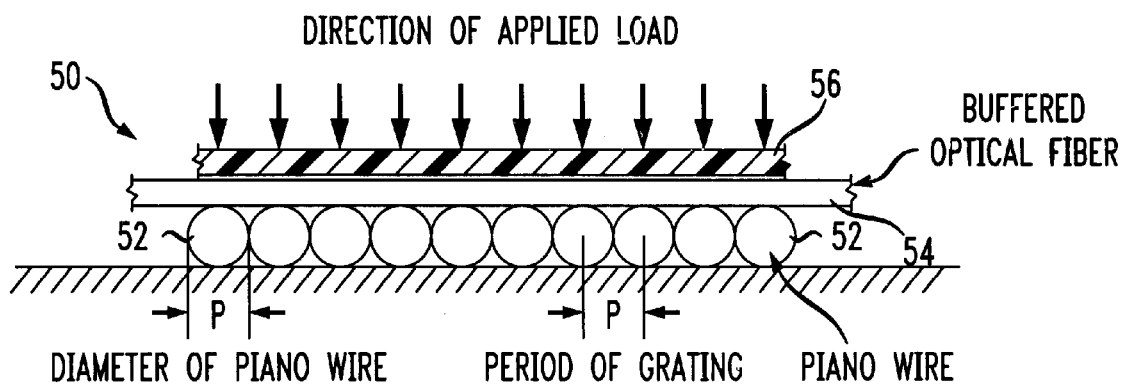
FIG. 3 is a side view of a prototype test set-up in which microbends were induced at one side of the axis of a buffered optical fiber.
Figure 4:
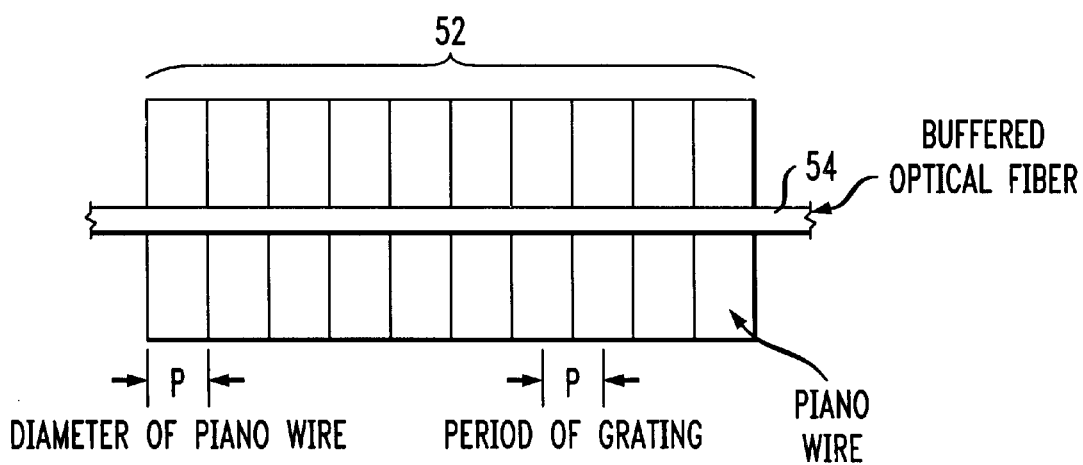
FIG. 4 is a top view of the test set-up in FIG. 3.

FIG. 3 is a side view of a prototype attenuator 50, and FIG. 4 is a top view of the attenuator in FIG. 3. Approximately four-inch lengths M of steel piano wire 52 were laid on a flat surface 54, parallel and in circumferential contact with one another. A buffered optical fiber 54 was aligned perpendicular to the wires 52, and a rigid plastics plate 56 was placed on top of the buffered fiber 54. Thus, the diameter of the wires 52 determined the period P of a single grating for the attenuator 50. Selected weights were then loaded on the plate 56. Microbending of the fiber 54 was therefore induced by the wires 52 being urged against the fiber buffer layer, at the lower side of the fiber axis as viewed in FIG. 3.

Figure 5:
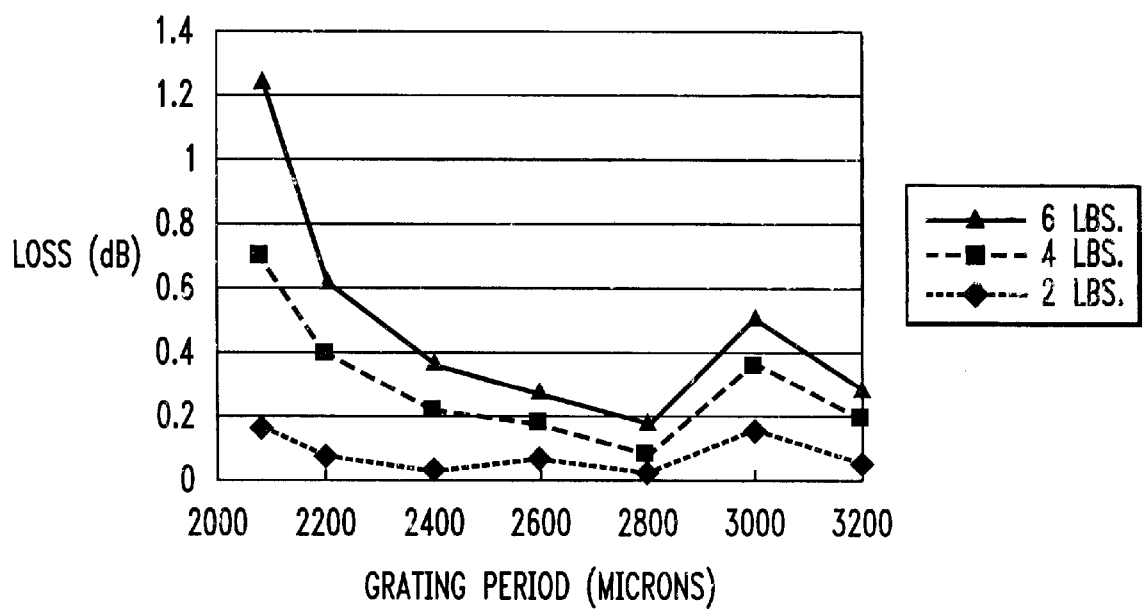
FIG. 5 is a plot of measured attenuation as a function of different grating periods used in the set-up of FIG. 3.

FIG. 5 shows attenuation measured in the fiber 54 as a function of the grating period P for three different load weights on the plate 56, viz., two, four and six pounds. The optical fiber 54 was a multi-mode fiber whose fundamental resonant coupling period (or fundamental "grating period") was about 990 microns. FIG. 5 illustrates that the loss induced in the buffered fiber is periodic as a function of the grating period for a given constant clamping force or weight applied on the plate 56 in FIG. 3.

Figure 6:
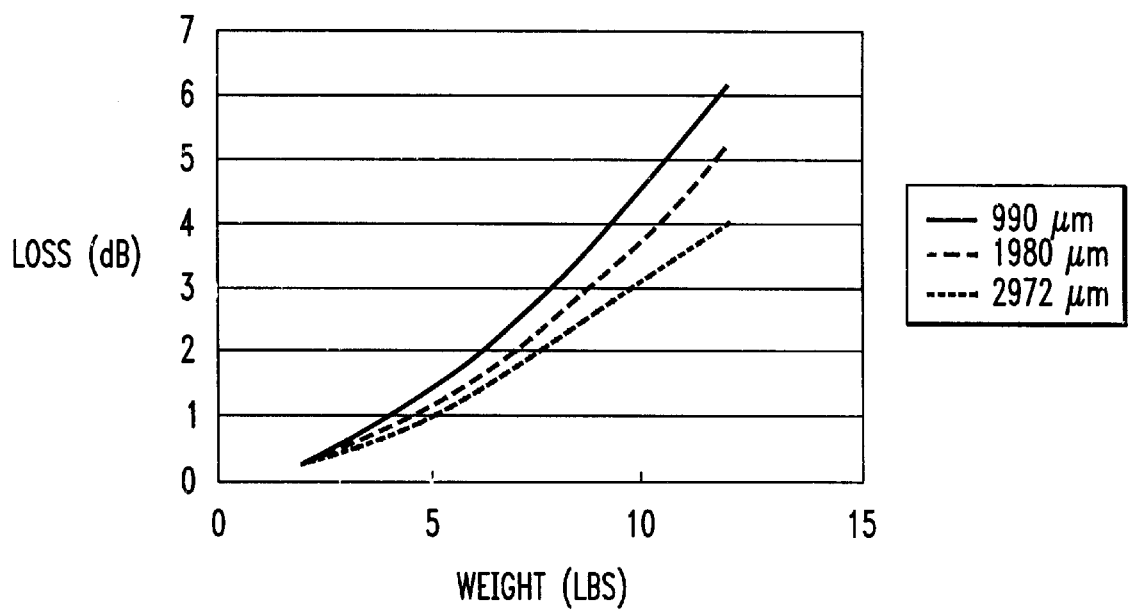
FIG. 6 is a plot of measured attenuation as a function of different applied loads for a PVC buffered optical fiber in the set-up of FIG. 3.
Figure 7:
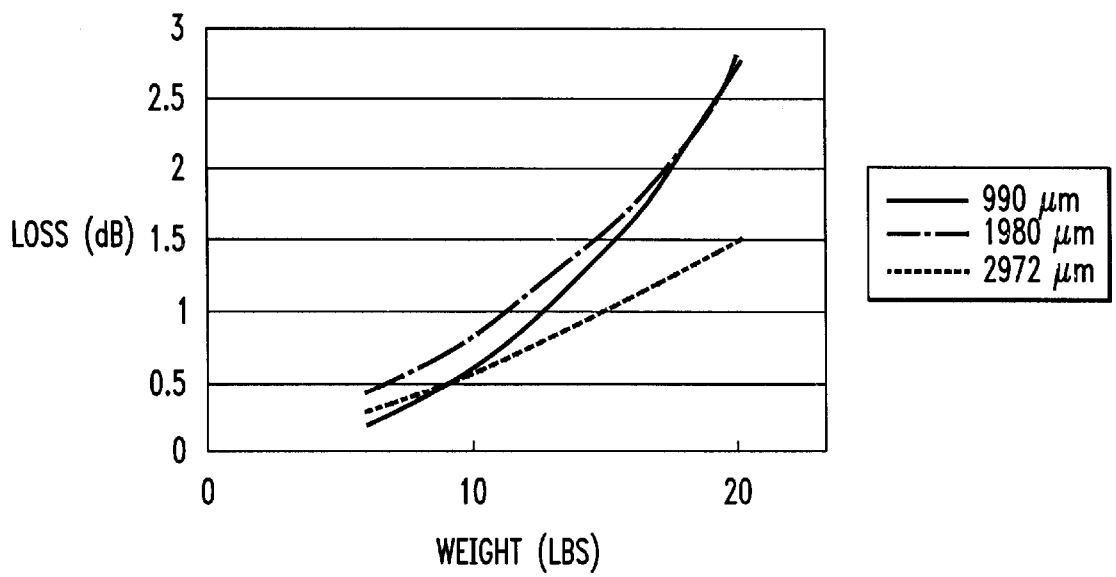
FIG. 7 is a plot of measured attenuation as a function of different applied loads for a nylon buffered optical fiber in the set-up of FIG. 3.

Specific conditions for the measurement data obtained in FIGS. 5–7 is as follows. The optical fiber 54 had a 62.5 micron core diameter, a 2% delta graded index multi-mode fiber with a 125 micron diameter cladding, and a 250 micron diameter UV cured coating. In FIGS. 5 and 6, the fiber had a PVC buffer material 900 microns in diameter. The PVC material was relatively soft and flexible. The fiber in FIG. 7 was the same as that used in the measurements of FIGS. 5 and 6, except with a nylon buffer material of ~900 microns diameter. The nylon buffer material was relatively hard and inflexible.

Fibers used in the measurements of FIGS. 5–7 were approximately 10 meters in length, and the point of test was at the center or at about 5 meters from one end of the fiber. An 850 nanometer wavelength light emitting diode (LED) was used as a test light source. The light was launched into the fiber and a steady-state mode distribution was achieved by wrapping the fiber about nine times around a one-inch diameter mandrel. Loss or attenuation measurements were made after loading the grating on the fiber with each weight in two-pound increments. Measurements were recorded after ten minutes to ensure adequate settling time. In FIGS. 6 and 7, three different grating periods were used, namely the determined fundamental grating period for the fiber 54, and periods at two and three times the fundamental period (N=2, 3).

For a PVC buffer material, FIG. 6 shows that the ability to induce attenuation at periods that are integer multiples of the fundamental period, is readily accomplished with only about 13% more weight or clamping force when the second order (N=2) grating period is used. Until now it was believed that 100% greater weight would be required. And, as the fundamental grating period of different optical fibers decreases (e.g., an 8.4 micron core diameter fiber, with 0.3% index delta, single mode, has a fundamental period of about 341 microns), grating periods two or three times the fundamental period may nonetheless be applied to the buffered fiber for controlled attenuation.

If the grating period is set too small, the buffer material may tend to deform and fill spaces between the teeth of the applied grating (or gratings). Increasing the period of the grating alleviates this effect, with the result that less clamping force is needed to induce attenuation. For example, for a nylon buffered fiber, FIG. 7 shows that the ability to induce loss at multiples of the fundamental period was demonstrated using less weight at the second order (N=2) grating period, than the weight needed at the fundamental period.

Figure 8:
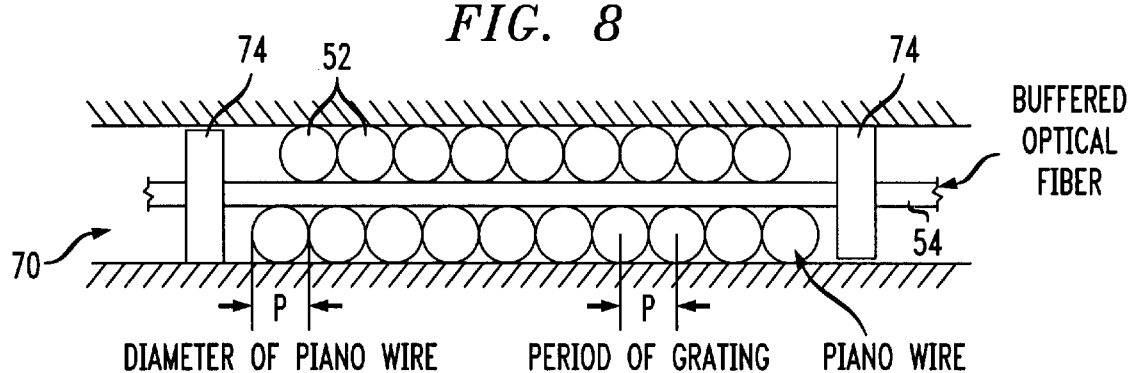
FIG. 8 is a side view of another embodiment of a grating attenuator according to the invention.

FIG. 8 is a side view of another embodiment of a grating attenuator 70 according to the invention. In the arrangement of FIG. 8, a complimentary grating formed by adjacent parallel lengths of wire is provided at the upper side of the axis A of the optical fiber 54, as viewed in FIG. 8. Closely machined mechanical stops 72, 74 are provided at both axial ends of the attenuator 70, and two additional stops (not shown in FIG. 8) may be aligned along either side of the fiber 54 parallel to its axis A. The stops are aligned beneath the clamping surfaces and act both to prevent the application of excessive clamping force on the fiber 54 by limiting movement of the clamping surfaces, and to ensure that a substantially uniform clamping force is applied over the length of the fiber 54 on which the attenuator 70 acts.

Figure 9:
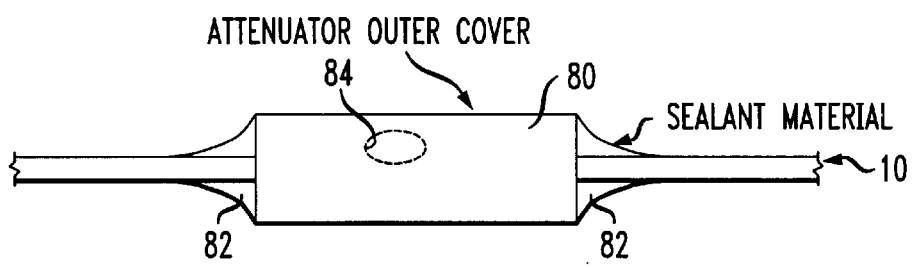
FIG. 9 is a side view of an attenuator installed on a jacketed fiber optic cable.

FIG. 9 is a side view of an attenuator according to FIGS. 2, 3 or 8, applied in-line over a length of fiber optic cable, wherein the attenuator is protectively enclosed. The attenuator has an outer covering 80 in the form of, e.g., a cylindrical elastomeric or plastics tube. The covering 80 may be filled with foam or gel to provide a barrier to water and moisture, as well as to act as a mechanical shock absorber. End caps 82 formed of PVC or similar material form a seal between the jacketed cable and the outer covering 80. An opening 84 with a removable seal or plug (not shown) is also provided in the covering 80 to allow access to an actuating mechanism (e.g., an adjustable screw) for varying the level of attenuation induced in the cable. Because clamping forces are developed only internally of the attenuator, the outer cover 80 need only be durable enough to withstand typical drop and mechanical shock testing.

The following table lists fundamental resonant coupling or grating periods for optical fibers commonly used in jumper cables. The period is derived according to the equation $\Lambda=2\pi a/(2\Delta)^{1/2}$ where a is core radius, and $\Delta$ is core/cladding index difference (delta) ratio, i.e., $(n_{CORE} - n_{CLADDING})/n_{CORE}$

| 2a | $\Delta$ | $\Lambda$ |
|---|---|---|
| 62.5 microns | 2% (MMF) | 981.7 microns |
| 50.0 microns | 1.1% (MMF) | 1,059 microns |
| 8.4 microns | 0.3% (SMF) | 340.7 microns |
| 9.5 microns | 0.3% (SMF) | 385.3 microns - |

While the foregoing description represents preferred embodiments of the invention, it will be obvious to those skilled in the art that various changes and modifications may be made, without departing from the spirit and the scope of the invention pointed out by the following claims.

I claim:

1. A method of attenuating light signals propagating in an optical fiber by a desired value, the fiber having a defined core radius (a) and core/cladding index difference ratio ($\Delta$), wherein a coating surrounds the cladding of the fiber for protecting the cladding from scratching, a buffer material surrounds the coating to protect the fiber further from mechanical damage, and an insulating cable jacket provides an outer covering for a cable in which the coated fiber and the buffer material are contained, the method comprising:

removing a determined axial length of the cable jacket from the cable at a given location where attenuation is desired to be introduced in the optical fiber contained in the cable, thus exposing an outer surface of the buffer material;

determining a fundamental resonant coupling period ($\Lambda$) for light signals propagating in the optical fiber in the absence of said buffer material, wherein $$\Lambda=2\pi a/(2\Delta)^{1/2},$$

where a is the core radius of the fiber, and $\Delta$ is the core/cladding index difference ratio for the fiber;

clamping a grating on the exposed outer surface of the buffer material with a certain clamping force, wherein said grating has a period that is N times said fundamental grating period, and N is a positive integer equal to or greater than two; and adjusting the clamping force until the desired value of attenuation is obtained at the given location in the optical fiber contained in the cable.

2. The method of claim 1, wherein N is set equal to three.
3. The method of claim 1, wherein N is set equal to four.
4. The method of claim 1, wherein the optical fiber has an outer diameter of about 250 microns.
5. The method of claim 1, wherein the buffer material surrounding the optical fiber has an outer diameter of about 900 microns.
6. The method of claim 1, wherein the optical fiber is a single mode fiber and said fundamental resonant coupling period is about 350 microns.
7. The method of claim 1, wherein the optical fiber is a multi-mode fiber and said fundamental resonant coupling period is about 1,000 microns.

* * * * *